May 6, 1958     E. L. McMULLIN     2,833,243

APPARATUS FOR COATING WINDINGS ON RODS

Filed Feb. 26, 1952

INVENTOR.
Earl L. McMullin.
BY
ATTORNEYS.

United States Patent Office 2,833,243
Patented May 6, 1958

2,833,243

APPARATUS FOR COATING WINDINGS ON RODS

Earl L. McMullin, Hastings, Mich., assignor to Orchard Industries, Inc., Detroit, Mich., a corporation of Michigan Application February 26, 1952, Serial No. 273,408

1 Claim. (Cl. 118—500)

The present invention relates to an improved method of and apparatus for coating windings on rods, such for example, as the windings used on fishing rods for mounting the eyes through which the fishing line passes.

It is an object of the present invention to provide an improved apparatus for applying a coating of hardenable material to such windings which apparatus is simple in design, economical of manufacture, easily used, and which greatly minimizes the work involved in applying such coating material and facilitates the quick and easy application of uniform coatings to such windings.

It is also an object of the present invention to provide an improved method of applying such coatings to such windings by means of which uniform coating of the windings at all sides thereof is insured.

Other and more detailed objects of the present invention will be appreciated from a consideration of the following specification, the appended claim and the accompanying drawing wherein:

Figure 1:
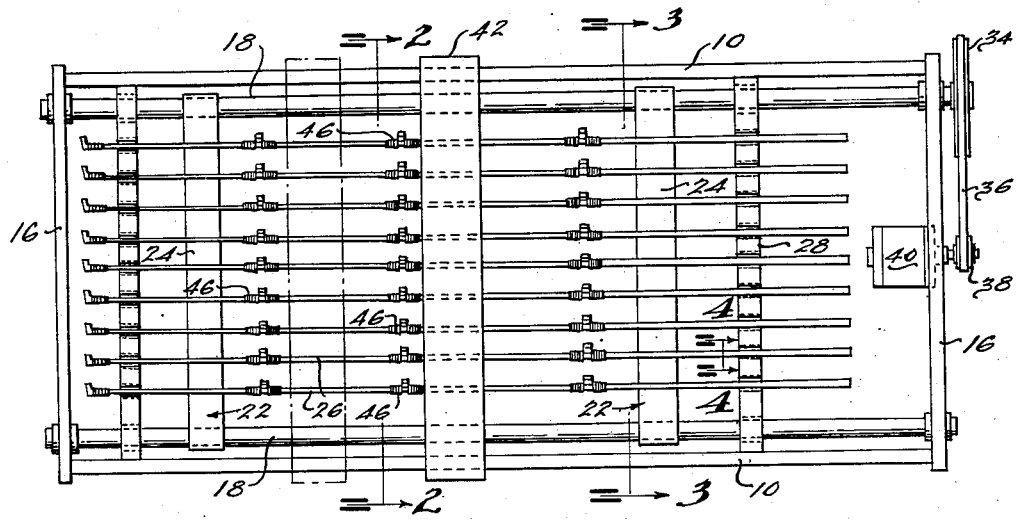
Figure 1 is a plan view of an apparatus embodying the present invention.

Referring to the drawing, the apparatus there illustrated comprises a pair of spaced parallel members 10 which are secured to and supported on a frame comprising legs 12 and diagonally extending connecting braces 14. The members 10 are interconnected at their opposite ends by transversely extending members 16. These transverse members 16 rotatably support a pair of parallel longitudinally extending shafts 18 which are disposed between and adjacent the members 10, and below the upper edges 20 of these members 10. A pair of endless belts 22 are trained about the shafts 18 and are formed of a material, or have their inner surfaces treated with a material such that the belts 22 may be driven by one of the shafts 18. These belts 22 are spaced longitudinally of the shafts 18 and have horizontally disposed upper courses 24 adapted to support a plurality of rods 26. The apparatus also includes a pair of transversely extending rod spacer elements 28 which are secured at their opposite ends to the members 10 and the upper edges of which are notched to provide a plurality of notches 30 spaced therealong, each adapted to receive one of the rods 26.

Figure 4 is an enlarged view of one of these notches and illustrates that these notches are preferably provided with a liner 32 of felt or other suitable material for preventing damage to the finish of the rod during rotation thereof as hereinafter described. The notches 30 extend below the upper course 24 of the belts 22 so that the rods 26 disposed in the notches 30 are supported on the belts 22 and the member 28 serves to maintain the rods 26 in spaced parallel relation. One of the shafts 18 extends outwardly of one of these transverse members 16 and carries a pulley 34 fastened thereto through which it is driven by means of a belt 36 which is trained over the pulley wheel 34 and also trained over a pulley 38 on the output shaft of a motor 40. It will be appreciated that upon operation of the motor 40, the belts 22 will be driven through the pulley 34 and the one of the shafts 18 to which it is fixed. The belts 22 through their frictional engagement with the rods 26 supported thereon, rotate the rods in their notches 30.

Figure 2:
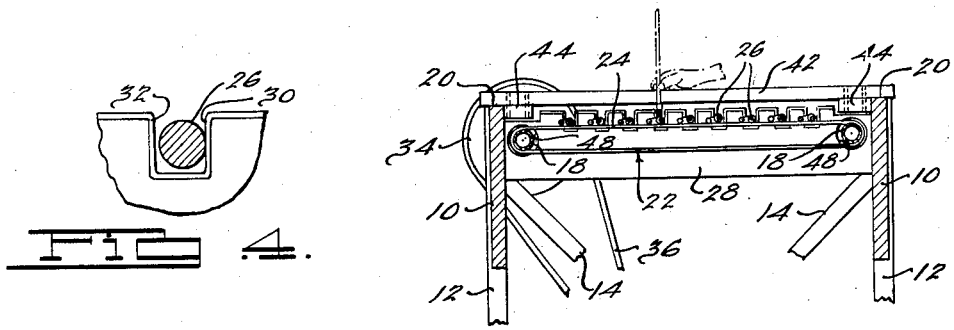
Figure 2 is a broken sectional view taken substantiallly along the line 2—2 of Figure 1.
Figure 3:
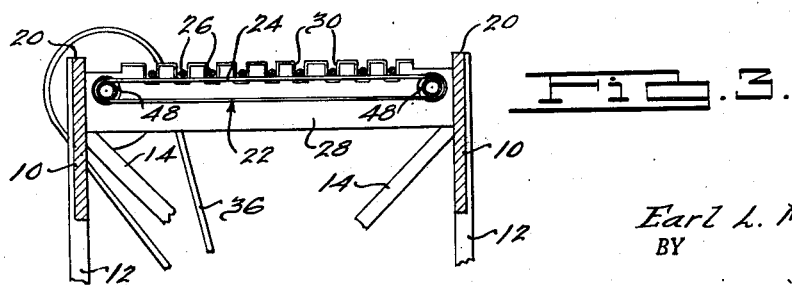
Figure 3 is a broken sectional view taken substantially along the line 3—3 of Figure 1; and, Figure 4 is an enlarged broken sectional view taken substantially along the line 4—4 of Figure 1.

A hand rest member 42 extends transversely of the members 10 and is supported upon the upper edges 20 thereof. Guide blocks 44 are fastened to the under side of the hand rest member 42 and are spaced to slidably fit between the longitudinally extending members 10. This hand rest member 42 is slidable longitudinally of the members 10 for positioning it adjacent corresponding windings 46 of the rods 26, as illustrated in Figures 1 and 2. With the hand rest member 42 disposed in the position illustrated in full lines in Figure 1, the operator may move his hand along the hand rest 42, generally in the position illustrated in Figure 2, and by means of a brush or other suitable applicator may apply a coating material to the corresponding of the windings 46 on the rods 26. The hand rest 42 may then be moved, as to the position illustrated in broken lines in Figure 1 and coating material may be similarly applied to the corresponding group of windings 46 adjacent the broken line position of the hand rest 42.

It will be noted that the transversely extending members 28 engage the rods intermediate the windings thereof to prevent interference therewith and in the construction illustrated are provided with apertures 48 through which the shafts 18 extend. It will also be noted that the hand rest 42 may be moved throughout the entire length of the upper edges 20 of the longitudinally extending members 10, thereby permitting the hand rest member 42 to be positioned for use in the coating of windings at any point along the length of the rods 26.

The present invention also contemplates the provision of an improved method of applying a hardenable coating material to the windings of rods or the like, such for example, as are used in mounting fishing rod eyes. In its broadest aspects this improved method comprises the applying of a hardenable coating material to these windings while rotating the rods, and continuing to rotate the rods until the coating material has taken a permanent set.

More specifically, the present method comprises the steps of supporting and rotating in spaced parallel relation, a plurality of rods having such windings, applying a hardenable coating material successively to the corresponding windings of the rods by successively holding a brush or other suitable applicator carrying the coating material, against each of the corresponding windings throughout at least one complete revolution of the winding, and continuing to rotate each of the rods until the coating material has taken a permanent set.

While only one specific embodiment of the invention has been illustrated and described in detail, it will be readily appreciated by those skilled in the art that numerous modifications and changes may be made without departing from the spirit of the present invention.

What is claimed is:

An apparatus for use in the coating of windings spaced along fishing rods and the like for mounting eyes or other parts thereon, said apparatus comprising a frame including a pair of spaced parallel rail members, a pair of supports extending transversely of and interconnecting said rails, a pair of spaced parallel shaft members rotatably mounted in said supports, a pair of endless belts trained about said shaft members to provide upper courses adapted to support a plurality of rods, said belts being adapted to be driven by at least one of said shaft members, a pair of spacer elements extending transversely of and supported on a pair of said members and having a plurality of notches spaced therealong extending below said upper courses of said belts and each adapted to receive one of said rods therein, and a hand rest member extending transversely of and mounted on said first named members and movable therealong for disposing said hand rest member adjacent windings on said rods and adapted to steady the hand of an operator during application of a coating material to said windings by said operator with a brush or other suitable means.

References Cited in the file of this patent

UNITED STATES PATENTS

| | | |
|---|---|---|
| 262,022 | DuBrul | Aug. 1, 1882 |
| 801,795 | Koelsch | Oct. 10, 1905 |
| 2,011,659 | Soyland | Aug. 20, 1935 |
| 2,264,523 | Gustafsson | Dec. 2, 1941 |
| 2,273,518 | Gloor | Feb. 17, 1942 |
| 2,275,382 | Smith | Mar. 3, 1942 |